June 29, 1937. R. H. POHL 2,085,602
COATING FOR FLOOR COVERING MATERIAL
Filed Feb. 18, 1933
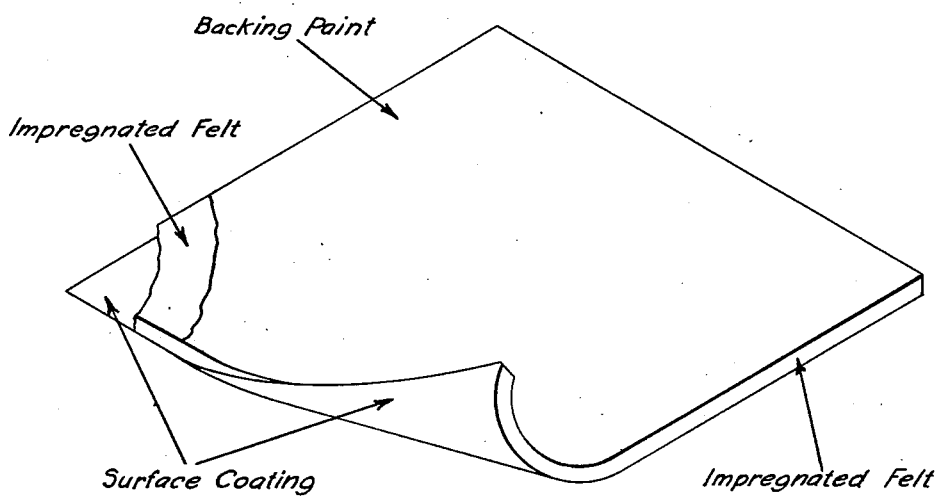
INVENTOR
ROBERT HOLMES POHL Patented June 29, 1937

2,085,602

UNITED STATES PATENT OFFICE 2,085,602

COATING FOR FLOOR COVERING MATERIAL

Robert Holmes Pohl, Upper Darby, Pa., assignor to Sloane-Blabon Corporation, Philadelphia, Pa., a corporation of Delaware Application February 18, 1933, Serial No. 657,350

6 Claims. (Cl. 134—54)

This invention relates to the art of manufacturing floor coverings made with a felt base impregnated with a saturating compound. This type of floor covering is known in the industry as felt base floor covering. More particularly, the invention relates to a coated felt base material, the coating of which includes a dried solid colloid and a dried soft material, plastic or liquid, which remains soft upon drying of the coating, and to a paint adapted to be used as a backing paint on such felt base goods.

In general, the backing paints used prior to this invention have consisted of suitable pigments with a binder or vehicle composed of organic compounds or mixtures thereof, such as rosins, drying oils, casein, proteins, gums, resins and/or waxes, and various inflammable organic solvents. In so far as these materials are combustible or inflammable, the covering is therefore subjected to fire hazard either during or after the processing, or both. Furthermore, the use of organic solvents tends to soften the saturant, and thereby to cause it to mingle with the coating material, with resulting stain or discoloration in the coating, and frequently with the further result that the coating becomes sticky and adheres to the supporting rolls during curing or drying, or to the face of the material when it is rolled.

According to the present invention, I propose to use water vehicle paints which, being immiscible with the saturant, have no tendency to soften or mingle with the saturant, and, on the contrary, form a perfect seal over the surface of the saturated felt. In the accompanying drawing is shown in perspective a portion of a sheet broken away to expose the felt and the surface coatings. This is given as an example of the use of the paint of my invention, and of the felt base product which results from its use.

The compositions which we prefer in paints for this purpose are aqueous dispersions of casein and/or soluble silicates to which have been added a quantity of a soft material, either plastic or liquid, which remains soft on drying, such as oils, drying, semi-drying and non-drying, including mineral oils, and rubber, to suppress any tendency of the coating toward excessive shrinkage on drying. I am aware that both silicate and casein water paints have been used for many years for other purposes. Such paints, however, have never been suggested for backing paints and, as a matter of fact, as shown by our experiments, are not satisfactory for such purposes, because of their characteristic of shrinking upon drying, which causes the sheet to curl, and thereby results in such difficulties during the further treatment of the sheet that such paints would be impracticable. I have discovered, however, that it is possible to produce a modified paint of this type which not only is satisfactory for use as a backing paint, but is actually superior to other compositions commonly used for the purpose. Among other advantages of such paints, they are cheaper, they are impervious to the saturant so that there is no tendency to discolor or become sticky, they are non-adhesive under all conditions, so that they do not adhere to the face of the goods when rolled, if the proportion of mineral pigments is high, and particularly if a silicate binder is used, they are fire-resistant, and are not softened or decomposed with heat, they are flexible, and they may be dried rapidly.

It is common practice with manufacturers of these felt base goods to pass the felt first through a bath of hot saturant, then through a coater and drier in which the backing and/or face paint is applied. The plant space required for these operations constitutes an important factor in the overhead cost of manufacturing goods of this type, and there has been a consistent effort to develop a coating material which could be dried in a shorter time and without external heating, so as to reduce the cost of these operations.

It is an important advantage of the present invention that the coating materials herein disclosed may be applied directly to the saturated sheet while still hot from the saturating bath, and that the coating compositions, particularly those containing silicate binder, will become apparently dry and non-adhesive while retaining from 10% to 15% of the water of the vehicle. Thus the coating material serves to reduce the time, space, and heat required for drying the coating.

The following may be given as an example of a backing paint which may be used according to my invention:

| | Parts by weight |
|---|---|
| Pigment and fillers | 1400 |
| Silicate solution | 800 |
| Water | 300 |
| Rubber latex | 120 |

The pigment may consist, for example, of 250 parts of a pigment such as lithopone, 550 to 600 parts of a pigment such as blue black talckene or ground slate flour, and 550 to 600 parts of clay as a filler.

The silicate used in this form is preferably grade N sodium silicate solution, approximately 62 parts of water to 38 parts of sodium silicate, corresponding to the formula $Na_2O \cdot 3.36SiO_2$. These are specified as exemplary, and it will be understood that variations from the particular composition may be made within the scope of my invention. Other soluble silicates may also be used, particularly potassium silicate.

The rubber is preferably added in the form of latex, as already suggested above, this being the natural milk of the rubber tree, hevea, containing about 38% rubber, and commonly containing small amounts of protective colloids or other materials which serve to stabilize the latex against coagulation. Artificial dispersions of rubber may also be used in place of the natural latex, or concentrated latex may be used containing a higher percentage of rubber, in which case a smaller proportion will be used than is specified in the above formula.

The hardness and resistance to alkali and water may be increased by the addition of small amounts, e. g., less than 10%, of metallic oxide, such as zinc oxide, lead oxide, etc., and the coating may be further hardened after drying, and its resistance to water and aqueous solutions increased by passing it through a bath or spray of an aqueous solution of ammonium sulphate, ammonium chloride, or other materials having a similar action.

The ingredients may be mixed in any suitable manner, as will be apparent to those skilled in the art. For example, the sodium silicate solution may be thinned with water to the desired viscosity or degree of dilution, after which the finely divided pigment or fillers are incorporated and suspended therein by the use of an agitator, mixer, grinding mill, pebble mill, ball mill, or other suitable device, and preferably the rubber is added last by stirring into the composition without violent agitation.

This coating may be applied to the felt base goods by spraying or flowing it upon the surface of the saturated felt, and evening the resulting film by means of a doctor blade, or other suitable device, or it may be applied by various other means familiar to those skilled in the art.

Instead of rubber, oils may be used as the soft material for suppressing shrinking tendencies of the coating. Thus, for example, a very satisfactory coating may be made using 80% of pigments, 15% of soluble silicate solids, and 5% of rosin oil, with sufficient water to give the necessary viscosity. The oil in this case is emulsified in the aqueous vehicle by any of the methods commonly used for emulsifying oils.

The rosin oil in this case serves the same function as the rubber in the first example given above,—namely, to prevent contraction of the film, and to render the coating more permanently flexible, water-resistant and stable. Although I have specified rosin oil as a particularly satisfactory oil for the purpose, I could use anything from mineral oil to the best of drying oils. The amount of oil used in this way should, of course, be sufficiently small to become enmeshed in the silicate or other binder, so that it will not dissolve the saturant or render the coating sticky.

This coating, if mixed with only enough water to give the necessary viscosity for satisfactory working, will set to an apparently dry film while retaining 10% to 15% of its water. It may be applied, for example, to the sheet which is still hot from the saturant, e. g., at a temperature in excess of 250° F., and in this manner I have obtained drying times of 26 seconds, or less.

Another coating which has proven very satisfactory is one consisting of

| | Parts by weight |
|---|---|
| Pennsylvania ochre | 125 |
| Oxide pigment | 15 |
| Water | 25–40 |
| Latex | 46–73 |
| Casein-silicate solution, (made by mixing together 500 parts of water, 2 parts of ammonia, 10 parts of borax, 80 parts of casein, and 92 parts of sodium silicate $Na_2O \cdot 3.36SiO_2$) | 37–59 |

The above formula may also be used substituting approximately 35 parts of casein for the sodium silicate, but in that case is less fire-resistant, not quite so fast drying, and otherwise less advantageous than with the formula as specified.

Although in the above I have particularly described several embodiments of my invention, these are given for the purpose of illustration and explanation, and are not to be taken as limiting. On the contrary, numerous changes and modifications may be made without departing from the scope of my invention.

I claim:

1. A backing paint comprising approximately 150 parts of pigment and approximately 75 parts of rubber latex distributed in a mixture of approximately 11 parts of casein, 1 part of borax and 0.3 part of ammonia in 50 parts of water.

2. A backing paint comprising approximately 150 parts of pigment and approximately 75 parts of rubber latex distributed in a mixture of approximately 8 parts of casein, 3 parts of sodium silicate $NaO \cdot 3.36SiO_2$, 1 part of borax, and 0.3 part of ammonia in 50 parts of water.

3. A backing paint for floor covering and like material which comprises pigment suspended in sufficient aqueous vehicle to form a fluid paint, said vehicle comprising an alkali silicate, a stable organic colloid and a small amount of rosin oil dispersed therein in sufficient quantity to make the paint substantially permanently flexible upon drying of the paint, and suppresses the tendency of the paint to excessive shrinkage upon drying.

4. A backing paint as defined in claim 3 in which the organic colloid is casein.

5. A backing paint as defined in claim 3 in which the backing paint when spread into a film and dried retains an appreciable quantity of water.

6. A backing paint for floor covering and like materials which comprises pigment suspended in sufficient aqueous vehicle to form a fluid paint, said vehicle comprising an alkali silicate, a stable organic colloid and a small amount of a substance chosen from the group consisting of rosin oil and rubber latex dispersed therein in sufficient quantity to make the paint substantially permanently flexible upon drying of the paint and suppresses the tendency of the paint to excessive shrinkage upon drying.

ROBERT HOLMES POHL.